US007013255B1

(12) United States Patent
Smith, II

(10) Patent No.: US 7,013,255 B1
(45) Date of Patent: Mar. 14, 2006

(54) TRAFFIC SIMULATION ALGORITHM FOR ASYNCHRONOUS TRANSFER MODE NETWORKS

(75) Inventor: Raife F. Smith, II, Denver, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 889 days.

(21) Appl. No.: 09/591,442

(22) Filed: Jun. 9, 2000

(51) Int. Cl.
*G06F 13/10* (2006.01)

(52) U.S. Cl. .............................. 703/21; 703/2; 703/13; 703/22; 709/223; 709/224

(58) Field of Classification Search ................. 703/13, 703/21, 24, 2, 22; 709/224, 223; 370/230
See application file for complete search history.

(56) References Cited

U.S. PATENT DOCUMENTS

| | | | | |
|---|---|---|---|---|
| 5,206,903 | A | | 4/1993 | Kohler et al. ............... 379/309 |
| 5,583,792 | A | * | 12/1996 | Li et al. ...................... 709/224 |
| 5,828,747 | A | | 10/1998 | Fisher et al. ................ 379/309 |
| 5,905,793 | A | | 5/1999 | Flockhart et al. ........... 379/266 |
| 5,982,873 | A | | 11/1999 | Flockhart et al. ........... 379/266 |
| 6,046,998 | A | * | 4/2000 | Niehaus et al. ........ 370/395.62 |
| 6,085,216 | A | * | 7/2000 | Huberman et al. ......... 718/104 |
| 6,088,441 | A | | 7/2000 | Flockhart et al. ........... 379/265 |
| 6,163,607 | A | | 12/2000 | Bogart et al. ............... 379/266 |
| 6,173,053 | B1 | | 1/2001 | Bogart et al. ............... 379/266 |
| 6,192,122 | B1 | | 2/2001 | Flockhart et al. ........... 379/266 |
| 6,269,330 | B1 | * | 7/2001 | Cidon et al. .................. 714/43 |
| 6,442,141 | B1 | * | 8/2002 | Borella et al. ............... 370/248 |
| 6,532,237 | B1 | * | 3/2003 | Or et al. ....................... 370/230 |
| 6,535,600 | B1 | | 3/2003 | Fisher et al. ........... 379/265.12 |
| 6,563,796 | B1 | * | 5/2003 | Saito ............................ 370/252 |
| 6,597,660 | B1 | * | 7/2003 | Rueda et al. ............. 370/230.1 |

OTHER PUBLICATIONS

"Wide Area ATM Network Experiments Using Emulated Traffic Sources" B. Lee, DARPA Technical Report ITTC-FY98-TR-10980-24, Jan. 1998.*
"Two-State MMP Modeling of ATM superposed Traffic Streams Based on the characterization of Correlated Interarrival Times" S.H. Kang, pp. 1422-1426, IEEE Global Telecommunications Conference, IEEE 1995.*
"End-to-End Modeling and Simulation of MPEG-2 Transport streams over ATM Networks with Jitter" W. Zhu, IEEE Transaction Circuits for Video Technology, vol. 8, No. 1, Feb. 1998 teaches modeling and simulation of ATM network packet traffic.*
"Analysis and Modeling of ATM Traffic Data", Y. chu, Proceedings fo the American Control Conference, pp. 4438-4440, Jun. 1999.*
"Simulation of nonGaussian Long-Range-Dependent Traffic using Wavelets", V. J. Ribeiro, Proceedings of ACM SIGMETRICS ACM Press 1999.*
"Design, Implemention, and Performance of a Native Mode ATM Transport Layer", Keshav, IEEE 0743-166X/96, IEEE 1996.*

(Continued)

*Primary Examiner*—Fred Ferris
(74) *Attorney, Agent, or Firm*—Sheridan Ross P.C.

(57) ABSTRACT

The present invention is directed to a traffic simulation algorithm for an asynchronous transfer mode communications (ATM) network. The algorithm recognizes that packets in ATM networks can have interarrival times that are lognormally distributed or lognormally and normally distributed. Lognormal and, in some cases, normal random number generators are used to generate packet interarrival times of a synthetic traffic stream.

37 Claims, 6 Drawing Sheets

OTHER PUBLICATIONS

Computer Simulation for the Evaluation of Static and Dynamic Priority Schemes in an ATM Multiplexer with Multimedia Traffic S. Al-Barrak, Int. J. Network Mgmt. 9, 359-369, 1999.*

"A Measurement-Based Admission Control Algorithm for Integrated Service Packet Netowrks", S. Jamin et el, IEEE/ACM Transactions on Networking, vol. 5, No. 1, Feb. 1997.*

Holtsinger et al.; "Analysis of Traffic Measurements in the VISTAnet Gigabit Networking Testbed"; Jul. 1993; *Department of Electrical and Computer Engineering, and Center for Communications and Signal Processing—North Carolina State University*; pp. 1-22.

Shock, et al.; "Measured Performance of an Ethernet Local Network"; Dec. 1980; vol. 23; *Communications of the ACM*; pp. 711-721.

Bottomley and Nilsson; "Traffic Measurements from a Working ATM Network"; 1995; *Proceedings of the IFIP Workshop on Performance Modeling & Evaluation of UTM Networks*; pp. 35/1-35/14.

* cited by examiner

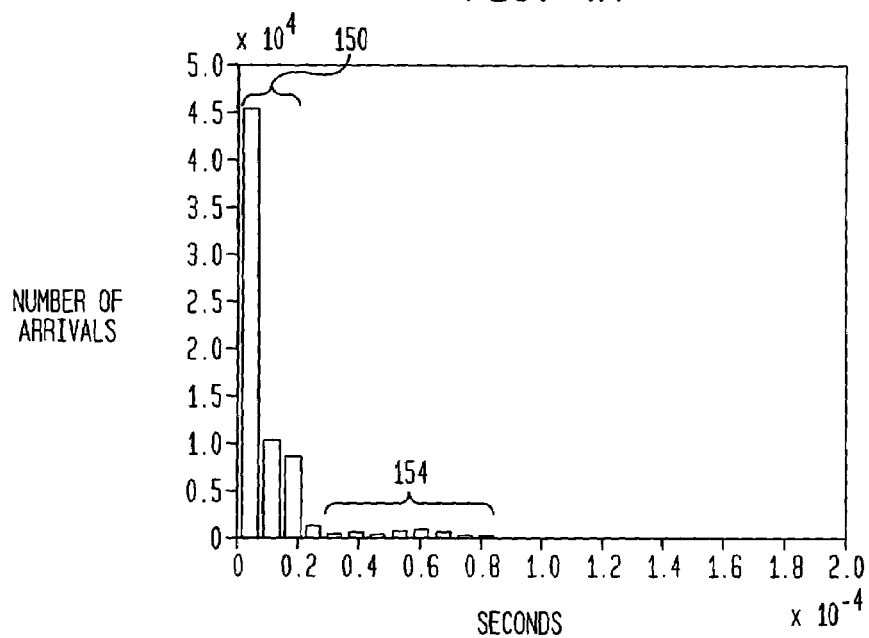
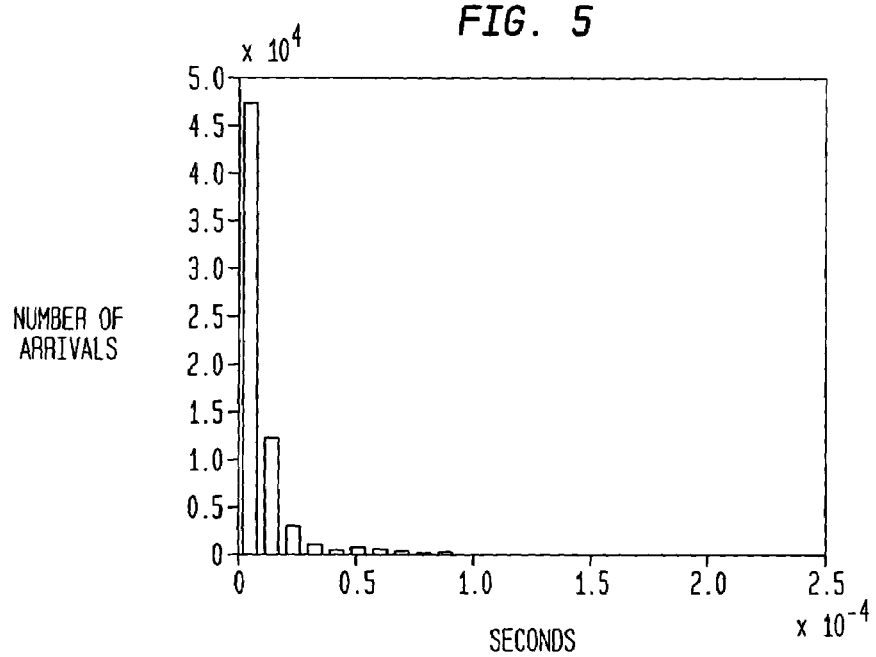

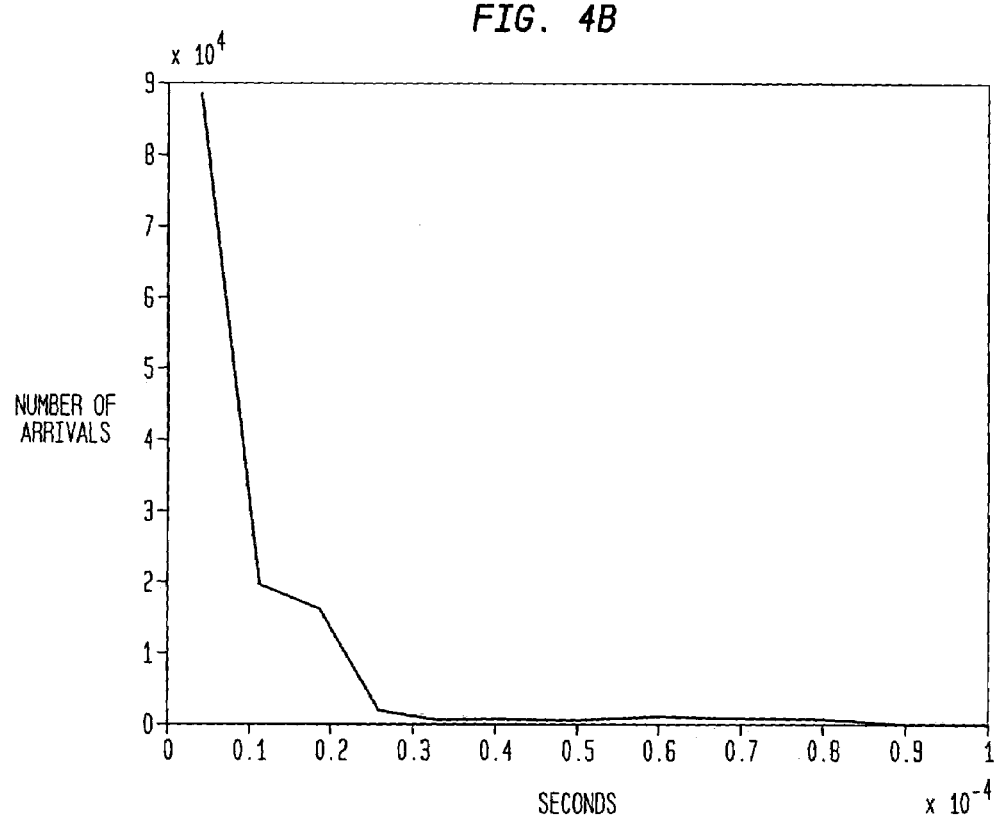

TRAFFIC SIMULATION ALGORITHM FOR ASYNCHRONOUS TRANSFER MODE NETWORKS

FIELD OF THE INVENTION

The present invention is directed generally to traffic simulation in telecommunications networks and specifically to traffic simulation in asynchronous transfer mode networks.

BACKGROUND OF THE INVENTION

The current public switched telephone network (PSTN) was implemented as a highly reliable, robust, and efficient system for transporting voice traffic. The PSTN has now been burdened with additional types of traffic for which the PSTN was not designed to transport (e.g., Internet, file transfer, video, fax, etc.). The current narrowband synchronous transfer mode (STM) telephony system will have to be replaced by or evolve into a broadband network to preserve the integrity of the system and accommodate the new services.

The asynchronous transfer mode (ATM) protocol has been selected as the core switching protocol for emerging broadband networks. ATM is an elegant protocol that has the desirable ability to multiplex voice, video, and data and to transmit information on the same communications channel at very high speeds. As used herein, ATM refers to a connection-oriented protocol in which bandwidth is allocated when the originating end user requests a connection. This allows ATM to efficiently support a network's aggregate demand by allocating bandwidth on demand based on immediate user need.

Problems have been encountered in modeling traffic on an ATM network, which has complicated the design and analysis of ATM networks. For a network to be properly sized and provisioned, the design engineer must thoroughly understand the traffic load and the behavior of that traffic load over time. Traditionally, STM networks were based on the Poisson model. Random number generators were used to produce streams of numbers, representative of real network interarrival times, and which are based on the Poisson model. However, this model is unable to accurately characterize the "bursty" nature of ATM network traffic. Burstiness is present in a traffic process if the arrival points appear to form visual clusters; that is, the packets have runs of several short interarrival times (i.e., the time interval between the receipt of successive packets at a specified destination from a specific source) followed by a relatively long one. As will be appreciated, voice and video packets in ATM networks are typically given a higher priority than data packets in routing or switching the packets for processing. Accordingly, data packets can have significantly longer packet interarrival times than voice or video packets.

Other models have been considered in modeling ATM traffic using random number generators, including the Markov Modulated model, the Transform Expand Sample model, the Autoregressive model, the Fluid model, and the Self-similar model. Although these models have been found to have varying degrees of success for modeling Ethernet traffic (which, like ATM networks, uses a packet-based protocol), they have been largely unsuccessful in characterizing the bursty nature of ATM traffic.

The failure of these models is in part due to the differences between ATM networks and other type of packet networks. For example, ATM is a connection-oriented protocol with a fixed length packet size. This contrasts with Ethernet which is a connectionless protocol with variable length packet size. Variable packet sizes give rise to a Gaussian (normal) or exponential probilistic distribution of packet interarrival times.

SUMMARY OF THE INVENTION

These and other needs are addressed by the methods and systems of the present invention. The present invention is premised on the recognitions (a) that interarrival times of packets in ATM networks can have a lognormal probabilistic distribution; (b) that delayed packets on an ATM network can follow a normal probabilistic distribution; and (c) that packet interarrival times in an ATM network corresponding to data packets alone or to data packets and voice and/or video packets typically have bimodal probabilistic distributions. In one configuration, a probabilistic distribution(s) is defined by a normal or self-similar (Gaussian) model and the other probabilistic distribution(s) is defined by a lognormal model. As used herein, a "network" refers to an architecture having two or more computers (e.g., each of which includes a processor and memory) connected by one or more communication paths (e.g., a local area network (LAN) or wide area network (WAN)). In a typical ATM network, short packet interarrival times (i.e., less than a selected value) define a lognormal probabilistic distribution while long packet interarrival times (i.e., more than a selected value) define a normal probabilistic distribution.

In a first embodiment of the present invention, a method for modeling or predicting the performance of (or simulating the traffic in) an ATM network is provided. The ATM network will transport or has transported a stream of packets. The method includes the step of generating (e.g., randomly or psuedorandomly) an at least substantially lognormally distributed set of packet interarrival times corresponding to the plurality of packets. By using lognormal number generators, the methodology of the present invention accurately considers the effect of ATM switch characteristics on traffic behavior. The simulated traffic generated by the algorithm compares closely with traffic on an actual ATM network. For this reason, the algorithm has applications in the areas of ATM switch design, ATM traffic simulation tools, and ATM network design and optimization (particularly the derivation of trunking tables, which are used to size and provision switch trunks).

In one configuration, the packet stream also includes a second plurality of packets having normally distributed packet interarrival times. In that event, the method would further include generating (e.g., randomly or pseudorandomly) a normally distributed set of packet interarrival times.

In another configuration, the method further includes the steps of (i) multiplying (a) a percentage of the packet stream that corresponds to the plurality of packets and (b) the number of packets in the packet stream to provide the number of packets in the plurality of packets and (ii) multiplying (a) a percentage of the packet stream that corresponds to the second plurality of packets and (b) the number of packets in the packet stream to provide the number of packets in the second plurality of packets. This is a typical step used in modeling an existing or planned ATM network. The total number of packets in the packet stream during a selected time interval can be selected using any technique for characterizing traffic in a communications network, such as busy hour, busy day, busy month, peak call rate, committed burst size, and the like.

The number generators can be any algorithm providing output defined by the desired probabilistic distribution (e.g., normal or lognormal probabilistic distributions). In one configuration, the number of generators are random or pseudorandom number generators. In one configuration, the number generators require input such as the number of packets in the plurality of packets (or sample size or vector length) and a mean and a variance of a lognormal distribution characterizing (or believed to characterize) packet interarrival times of the plurality of packets (for the lognormal random number generator) or the number of packets in the second plurality of packets (or second sample size) and a mean and a variance of a normal distribution characterizing (or believed to characterize) packet interarrival times of the packets in the second plurality of packets (for the normal random number generator). As will be appreciated, other techniques may be used to generate lognormal or normal distributions of packet interarrival times including artificially constructed ATM packets (comprising a series of ones and zeros, 58 bytes in length) which have lognormal and normal time interval distributions between packets.

In another configuration, the second plurality of packets has a bimodal distribution. This is a common occurrence when voice and/or video packets arrive at different times such that the data packets have a wide range of packet interarrival times. In this configuration, (a) a lognormal fraction of packets in the second plurality of packets having at least substantially lognormally distributed packet interarrival times and (b) a normal fraction of packets in the second plurality of packets having at least substantially normally distributed packet interarrival times are determined. The generating step for the packets in the second plurality of packets is applied to the number of packets in the normal fraction of packets. For the number of packets in the lognormal fraction of packets, the step of generating an at least substantially lognormally distributed set of packet interarrival times such as by using a lognormal random or pseudorandom number generator is provided.

In yet another embodiment, a system for characterizing traffic on an ATM network is provided. The system includes lognormal number generating means for generating a plurality of at least substantially lognormally distributed values corresponding to the plurality of packets.

In yet a further embodiment, a system for characterizing traffic on an ATM network is provided that includes:
(i) a lognormal number generator for generating a plurality of at least substantially lognormally distributed values corresponding to the first plurality of packets; and
(ii) a normal number generator for generating a plurality of at least substantially normally distributed values corresponding to the second plurality of packets; and
(iii) a combiner, in communication with the lognormal number generator and the normal number generator, for combining the plurality of lognormally distributed values and the plurality of normally distributed values to provide an aggregate stream of values.

In yet another embodiment, a method for modeling or predicting packet interarrival times on an ATM network is provided. The method includes the steps of:
(i) providing (a) a number of packets in a first portion of a plurality of packets that will be transported or have been transported on an ATM network, the packets in the first portion containing at least one of voice and video information and (b) a number of packets in a second portion of the plurality of packets, the packets in the second portion containing information other than the at least one of voice and video information;
(ii) generating with a lognormal number generator a plurality of packet interarrival times values corresponding to at least some of the packets in the first portion; and
(iii) generating with a normal number generator a plurality of packet interarrival times corresponding to at least some of the packets in the second portion. The summation or combination of the output of the two types of number generators provides a synthetic traffic stream that closely resembles the actual behavior of the modeled ATM system.

The foregoing description of the various embodiments of the present invention is intended to be neither complete nor exhaustive. Those of ordinary skill in the art will appreciate that numerous other embodiments can be envisioned using one or more of the components set forth above. For example, a variety of systems can be envisioned for performing the method steps noted above.

BRIEF DESCRIPTION OF THE DRAWINGS

FIGS. 4A and 4B are plots of number of packet arrivals (vertical axis) against packet interarrival time (horizontal axis) for an ATM network;

FIG. 5 is a plot of number of packet arrivals (vertical axis) against packet interarrival time (horizontal axis) for synthetic data for an ATM network;

DETAILED DESCRIPTION

Figure 1:
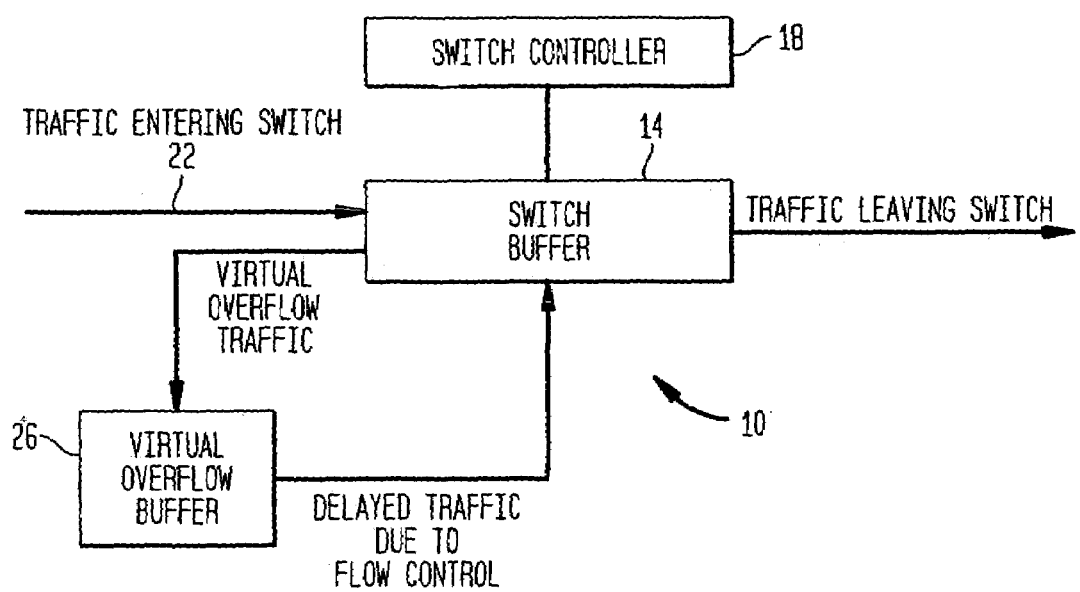
FIG. 1 is a flow diagram of an ATM switching architecture.

Referring to FIG. 1, a typical ATM switching architecture is depicted. The ATM switch 10 includes a switch buffer 14 and switch controller 18. Although an ATM cell or packet in the traffic 22 entering the switch 10 contain bits for discard priority, it is preferable to slow the traffic 22 down rather than degrade the level of service by discarding packets. Flow-control mechanisms in the switch controller 18 limit the arrival rate when the distination buffers become full. In other words, packets which arrive after the buffer is full must wait until buffer space is made available by departing packets. The overflow traffic can thus result in a virtual overflow buffer 26 whose size depends on the transmission speed and buffer size of the switch. As cells are drained away from the buffer 14, cells waiting in the virtual overflow buffer 26 are admitted to the buffer 14.

A very desirable feature of ATM switches is that they are priority-based and policy-based. Priority-based refers to an ATM switch's capability to assign an admission and transmission priority to an ATM cell based on the type of information it caries (voice, video, or data). Policy-based refers to an ATM switch's capability to assign admission and transmission priority to an ATM cell based on both the type of information it is carrying and the time of day. For example, voice usually has a higher priority than data. However, a switch administrator might want to give data the highest priority for certain hours of the day for example, late at night. Thus, an ATM based network gives network administrators much control over shaping the characteristics of traffic on their networks.

Packets passing through the switch can have a broad range of packet interarrival times at their respective destinations. Because voice and video packets have higher admission priority to the switch buffer 14 and much higher sensitivity to delay, packets containing such information typically have short packet interarrival times. In contrast, packets containing information other than voice or video have a lower admission priority to the buffer 14 and will typically have a wide range of packet interarrival times ranging from short interarrival times to long interarrival times, depending on the volume of higher priority packets received by the switch.

The broad range of packet interarrival times defines a bimodal probabilistic distribution. The packets having shorter interarrival times define a substantially lognormal probabilistic distribution while those having longer interarrival times define a substantially normal or self-similar probabilistic distribution. As will be appreciated, a lognormal distribution is a continuous distribution of a random variable whose logarithm is normally distributed. It typically resembles a positively or negatively skewed curve. The typical probability density function of a random variable X having $\Lambda(\mu\delta^2)$ is:

$$P(x) = \begin{cases} \frac{1}{\sqrt{2\pi}\sigma} e^{-(x-\mu)^2/2\sigma^2} & x \geq 0 \\ & x \leq 0 \end{cases}$$

where, $\mu$ is the mean $\delta$ the standard deviation and $\delta^2$ the variance. A typical probability density function for a normal or Gaussian distribution is:

$$P(x) = \begin{cases} \frac{1}{\sqrt{2\pi}\sigma} e^{-(x-\mu)^2/2\sigma^2} & -\infty \leq x \geq \infty \end{cases}$$

where X is a random variable, $\mu$ is the mean, $\delta$ the standard deviation, and $\delta^2$ the variance.

Figure 2:
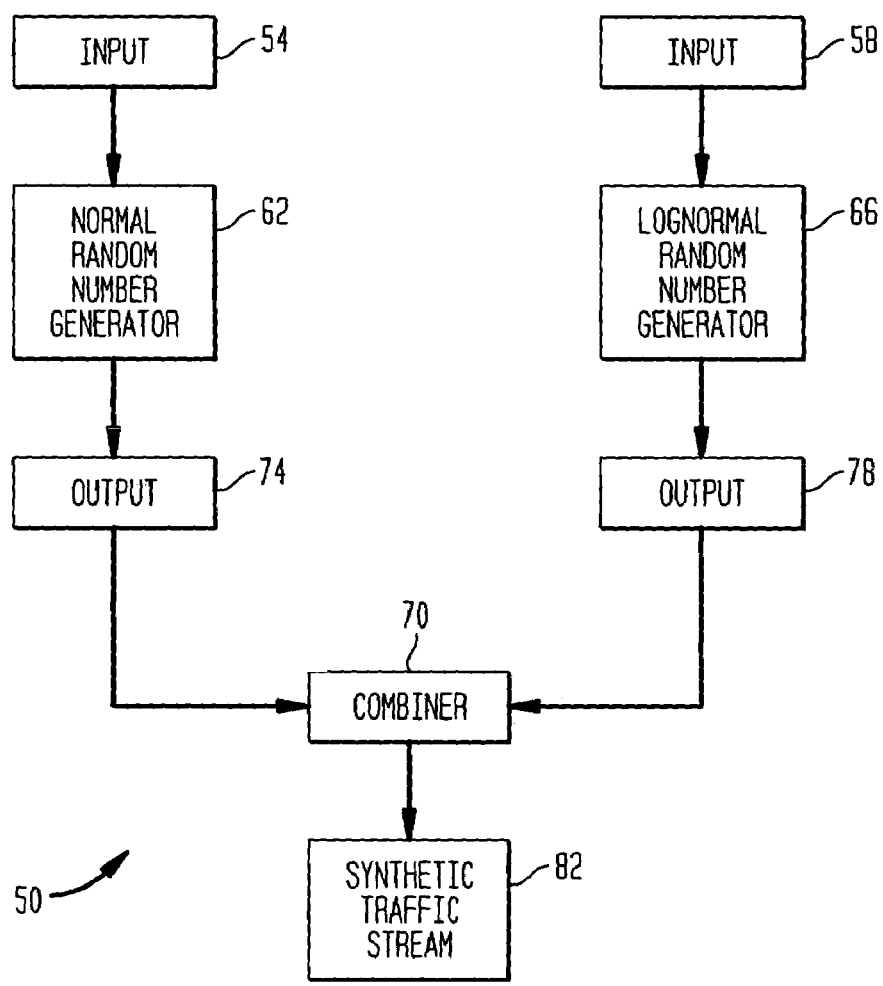
FIG. 2 is a flow diagram of a modeling architecture according to an embodiment of the present invention.

Referring to FIG. 2, an architecture for modeling or simulating packet interarrival times in an ATM switch is illustrated. The architecture 50 includes inputs 54 and 58, normal number generator 62 for generating an at least substantially normally distributed set of interarrival times, lognormal number generator 66 for generating an at least substantially lognormally distributed set of interarrival times, and combiner 70. Input 54 inputs the number of packets (in the packet stream 22 passing through the ATM switch) having normally distributed packet interarrival times and the mean and variance of the corresponding normal distribution into the normal number generator 62. Input 58 inputs the number of packets (in the packet stream 22 passing through the ATM switch) having lognormally distributed packet interarrival times and the mean and variance of the corresponding lognormal distribution into the lognormal number generator 66. Although any random or pseudorandom number generator that produces values having the desired probabilistic distribution can be used for the number generator, preferred random or pseudorandom generators are the MATLAB™ lognormal and normal random or pseudorandom number generator programs distributed by The MathWorks, Inc. The combiner 70 combines the outputs 74 and 78 from the generators 62, 66, respectively, to form a synthetic traffic stream 82. The synthetic traffic stream 82 replicates the distribution of packet interarrival times resulting from the ATM switch 10 and the mixture of packet types in the traffic 22 entering the switch 10.

Figure 3:
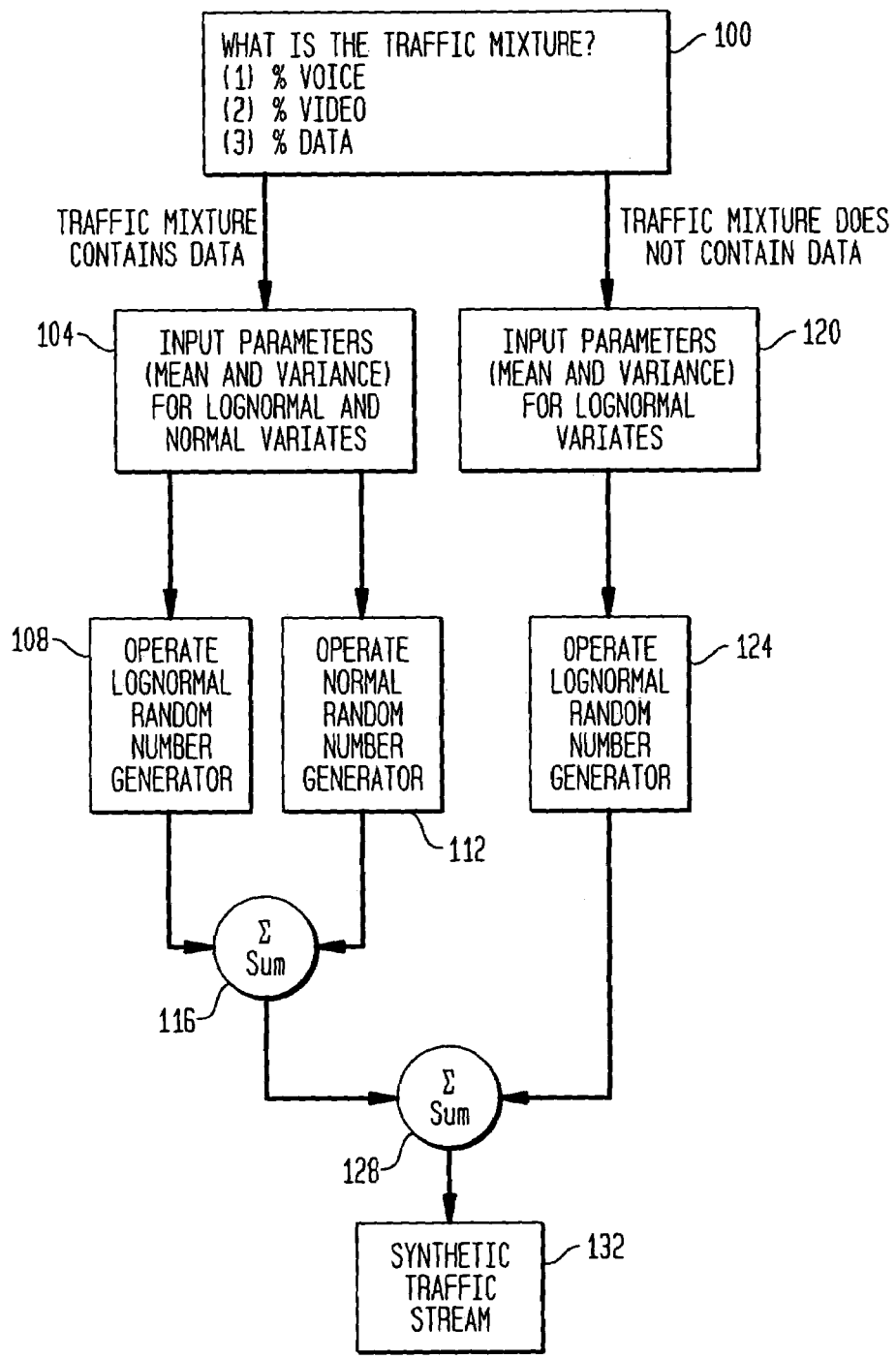
FIG. 3 is a flow schematic of software according to another embodiment of the present invention.

FIG. 3 is a flow schematic of an embodiment of a method for operating the architecture of FIG. 2. In box 100, the user must determine the traffic mixture. In a typical ATM network, the traffic 22 is characterized or defined in terms of the share or percentage of the packets in the traffic 22 entering the switch that contain voice information, that contain video information, and/or that contain data (information other than voice and/or video information). With this mixture, the number of packets containing each type of information, namely voice, video, and data, can be determined by multiplying the percentages by the total number of packets passing through or routed by the switch during a selected time interval. In some applications, a volumetric range of packets in each category (voice, video, and data) will be determined.

In some applications, packets (such as those containing data) will have interarrival times characterized by a bimodal distribution; that is, some of the packets will have interarrival times that are distributed normally and other of the packets will have interarrival times that are distributed lognormally. In such applications, the numbers of packets in each category must be determined. This can be done by assigning a percentage or range of percentages to the portion of the packets having normally distributed interarrival times and/or lognormally distributed interarrival times. These percentages or ranges of percentages can then be multiplied by the total number of packets passing through or routed by the switch in a specified time interval to yield the number of packets in each category (i.e., having normally or lognormally distributed interarrival times).

In box 104, the pertinent input parameters are input into the normal number generator 62 and lognormal number generator 66. For the normal number generator 62, the input variables are the mean and variance of the normal distribution of the data packet interarrival times (that are distributed normally) and the total number of data packets of this type passing through the switch during the selected time interval. For the lognormal number generator 66, the input variables are the mean and variance of the lognormal distribution of the data packet interarrival times (that are distributed lognormally) and the total number of data packets of this type passing through the switch during the selected time interval.

In boxes 108 and 112, number generators each generate and output values that can be a serial stream of packet interarrival times and/or a series of sets of values, e.g., a packet interarrival time and the number of packets corresponding to the packet interarrival time. The total number of values generated by each generator is typically equivalent to the number of data packets having normally distributed interarrival times (for the normal number generator) and to the number of data packets having lognormally distributed interarrival times (for the lognormal number generator).

The outputted values from each number generator are combined in a summing step 116 to form a composite traffic stream of data packet interarrival times.

In box 120, parameters are inputted into a lognormal number generator 66 (which may be the same or different from the generator 66 operated in box 108) in relation to the packets containing voice and/or video information. The inputted variables include the total number of packets containing voice and/or video information that are routed by the switch during the selected time interval and the mean and variance of the lognormal distribution of the voice and/or video packet interarrival times. In certain applications, the lognormal distributions of voice packets on the one hand and video packets on the other are different. In such situations, separate lognormal number generators 66 can be used to handle the differing input parameters (i.e, the differing numbers of voice and video packets, the differing means and variances of the two distributions, and the like).

In box 124, a stream of values are generated by the lognormal number generator. As noted, the values can be a serial stream of packet interarrival times and/or a series of sets of values, namely a packet interarrival time and the number of packets corresponding to the packet interarrival time. The number of values outputted by the number generator 66 is typically the same as the total number of voice and/or video packets routed by the ATM switch during the selected time interval.

In box 128, the composite traffic stream of data packet interarrival times (from box 116) and the stream of voice and video packet interarrival times (from box 124) are combined to produce a synthetic traffic stream 132. The synthetic traffic stream 132 can be used to design the various components of the ATM network. For example, the traffic stream 132 can be used to determine the required number of buffers and/or buffer capacity, the desired transmission speed of packets, peak delay of traffic stream and optimum traffic mix (e.g., voice, video or data) of an ATM traffic channel.

EXPERIMENTAL

FIGS. 4A and B present actual data taken from an ATM network. The network was serviced by a Fujitsu FETEX-150™ multi-service switching platform providing ATM switching services in the network. The host ATM was implemented using self-routing modules in a multi-stage network. It provided switching functions and served as the center for call processing and operations, administration, maintenance, and provisioning. Two broadband remote switching units in the network contained the customer interfaces and performed line concentration functions. Three customer sites were connected to the ATM network in a physical star configuration via Synchronous Optical NETwork (SONET) fiber links operating at 622.08 Mb/s (OC-12 rate).

Forty-one files were obtained, fifteen of which were corrupted and unusable. The data was collected during eight data collection sessions on four different days over a four month period. Busy hour sampling was performed because packet interarrival processes were non-stationary.

The data files were uncompressed and processed with a statistical analysis program. The statistical analysis program provided a file with the number of data cells, data bursts, interarrival cells, and interarrival bursts in the data. The file also contained the traffic data stream itself represented as a column of integers. The traffic data stream from each file was separated into three files: (i) the complete traffic data stream, (ii) the data cell traffic stream, and (iii) the interarrival cell stream. The data files were input into MATLAB™ for analysis.

The individual files within a session were analyzed individually and then concatenated and analyzed collectively. Since the results from the eighth session were representative of the entire body of data and since this was one of the larger data sets, the results from this session will be discussed below.

FIGS. 4A and B are histograms of the interarrival times for this session. As can be seen from FIGS. 4A and B, the histogram appears as a mixture of two distributions: a large lognormal distribution 150 for packet interarrival times of about $0.3 \times 10^{-4}$ seconds or less and a much smaller normal distribution 154 for packet interarrival times exceeding about $0.3 \times 10^{-4}$ seconds. The much smaller normal distribution 154 caused by the switch input buffer filling up. These delayed packets form queues which are similar in length and distribution to Ethernet packets (which have normally distributed packet interarrival times). The majority of the interarrival times were very short in length, with the mean interarrival time being approximately $0.3 \times 10^{-4}$ seconds.

Model fitting was performed to characterize the curve defining the data in FIG. 4B. The following model was developed: $F(x) = \Psi \cdot \Lambda(\mu_a, \delta^2_1) + (1-\Psi) \cdot N(\mu_2, \delta^2_2)$ where the mixing parameter, $\Psi$, is about 0.97, $\mu_1$, the mean of the lognormal distribution 150, is about −12.0156, $\delta_1^2$, the variance of the lognormal distribution 150, is about 1.3850.

$\mu_2$, the mean of the normal distribution 154, is about $6.1293 \times 10^{-5}$, and $\delta_2^2$ the variance of the normal distribution 154, is about $1.6464 \times 10^{-5}$.

Using the means and variances of the model and the sample size of FIGS. 4A and 4B, the data in FIG. 5 was generated using lognormal and normal random number generators in MATLAB™. A comparison of FIGS. 4A and 5 demonstrates the close correlation between the actual and synthetic data. Of course, a simple moment matching model will not perform well in capturing the burst pattern characteristics of the data. An algorithm which synthesizes the buffering and transmission characteristics of the sending and receiving mechanisms would produce burst patterns similar to those of real traffic.

In the model, the mixture parameter, $\Psi$, is dependent on (i) the speed at which traffic enters and leaves the switch, (ii) the priority of the traffic, and (iii) the size of the switch input buffers. As the transmission speed and/or buffer size increases, the parameter $\Psi$ tends to 1 and the traffic distribution tends to total lognormality.

Another ATM local area network was designed and built for the purpose of investigating the architecture and management algorithms appropriate to the local area. The network architecture is a manageable network, i.e., both the network resources and resource demands made by traffic are identifiable and quantifiable.

An ATM camera was set up to transmit 25 frames per second, JPEG compressed, 24 bits per pixel color video from a regular television transmission. The ATM camera transmitted cells to a network port controller which performed the traffic measurements, and from there to a Sun Sparc 10 workstation which displayed the video. The traffic trace is the first 1000000 cells of transmission, which included both action scenes (an explosion) and relatively static portions when credits were rolling on the screen.

Figure 6:
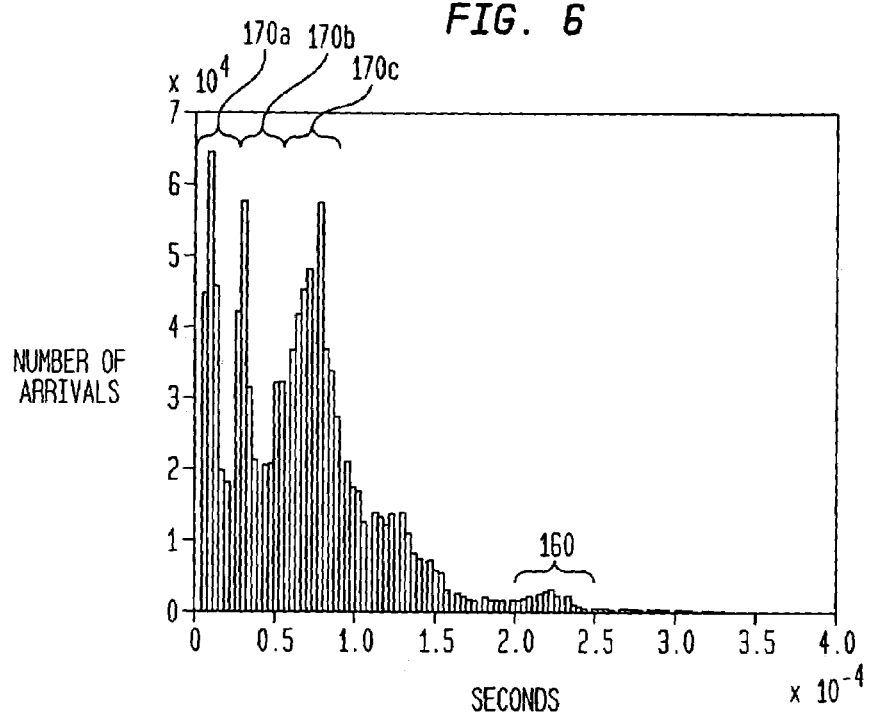
FIG. 6 is a plot of number of packet arrivals (vertical axis) against packet interarrival time (horizontal axis) for an ATM network.

FIG. 6 is a histogram plot of the camera data. The histogram of traffic interarrival times is heavy tailed and contains a relatively small normal distribution 160 after main lognormal distributions 170a–c. The peak in the tail 160 is around 0.225 msec, which is nearly four times the magnitude of the peak in the tail 154 of FIG. 4A (around 0.06 msec). The input buffers of the ATM switches in both requirements were 128k bytes. The higher egress speed of the architecture in the first experiment allowed the buffers to clear faster, which resulted in less cell delay and a lighter tail distribution.

Model fitting was performed to characterize the curve defining the data in FIG. 6. The following model was developed for the curve which had three lognormal distributions 170a–c and one normal distribution 160:

$$F(x) = (0.20\ \Psi)\cdot\Lambda(\mu_1, \delta^2_1) + (0.20\ \Psi)\cdot\Lambda_2(\mu_2, \delta^2_2) + (0.60\ \Psi)\cdot\Lambda_3(\mu_3, \delta^2_3) + (1-\Psi)\cdot N(\mu_4, \delta^2_4)$$

where the mixing parameter, $\Psi$, is about 0.98, $\mu_1$, the mean of the first lognormal distribution 170a, is about −11.5784, $\delta_1^2$, the variance of the first lognormal distribution 170a, is about 0.5194, $\mu_2$, the mean of the second lognormal distribution 170b, is about −10.3165, $\delta_2^2$, the variance of the second lognormal distribution 170b, is about 0.1997, $\mu_3$, the mean of the third lognormal distribution 170c, is about −9.3908, $\delta_3^2$, the variance of the third lognormal distribution 170c, is about 0.3095, $\mu_4$, the mean of the normal distribution 160, is about $2.2546 \times 10^{-4}$, and $\delta_4^2$, the variance of the normal distribution 160, is about $2.1980 \times 10^{-5}$.

The first and second lognormal distributions 170a and b were each deemed to be 20% of the total lognormal distribution 170a–c, and the third lognormal distribution 170c was deemed to be 60% of the total lognormal distribution 170a–c.

Figure 7:
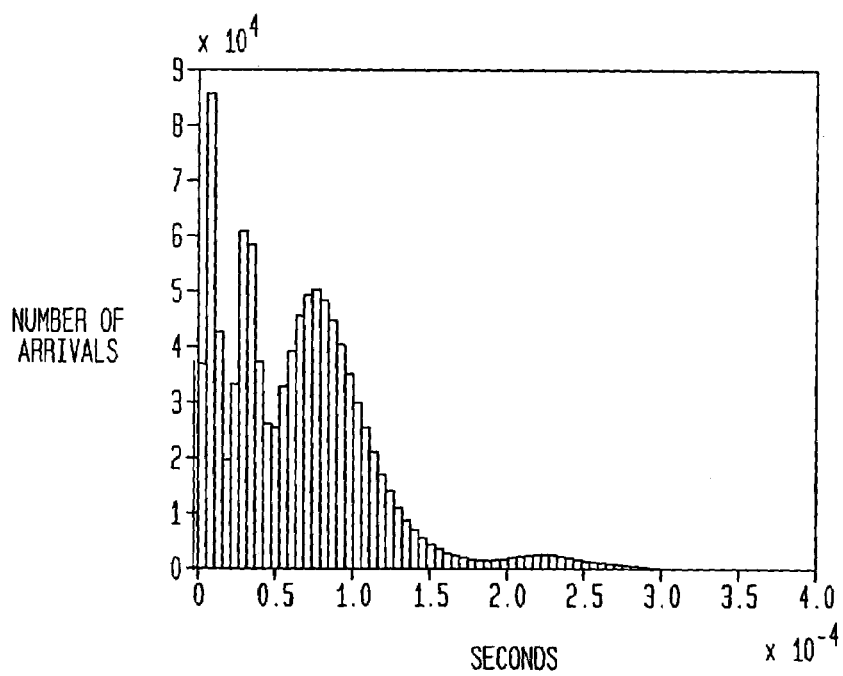
FIG. 7 is another plot of number of packet arrivals (vertical axis) against packet interarrival time (horizontal axis) for synthetic data for an ATM network.

FIG. 7 is a histogram generated with the MATLAB™ lognormal and normal random number generators using the means and variances in the model and the sample size in FIG. 6. As in the case of FIGS. 4A and B and 5, the computer generated data in FIG. 7 closely correlates with the actual data in FIG. 6.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. By way of example, the architecture of FIG. 2 could have a number of lognormal and/or normal random number generators operating in parallel on differing portions of the packet stream. This may be the case for data, voice, and video packets or different lognormal distributions within a packet type or among packet types such as those in FIG. 6. Alternatively, the lognormally distributed interarrival times for voice, video and data packets can be replicated using a single lognormal random number generator. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. In a packet-switched network, the network comprising at least one Asynchronous Transfer Mode or ATM switch and at least one ATM device other than the ATM switch, a method for analyzing the behavior of the network by performing steps comprising:
   (a) determining first and second proportions of a total number of packets transmitted and/or to be transmitted by the ATM network over a selected time interval, wherein the first proportion is associated with first packets of a first packet type and the second proportion is associated with second packets of a second packet type;
   (b) based on a first mean and variance, generating a first set of packet interarrival times representative of first packets, wherein each first packet has at least one of (i) a packet interarrival time less than a selected value, (ii) a packet payload of voice and/or video information, and (iii) at least a first admission priority, and wherein the distribution of the first set of packet interarrival times is at least substantially lognormal;
   (c) based on a second mean and variance, generating a second set of packet interarrival times representative of second packets, wherein each second packet has at least one of (i) a packet interarrival time of more than the selected value, (ii) a packet payload of information other than voice and/or video information, and (iii) less than the first admission priority and wherein the distribution of the second set of packet interarrival times is at least substantially normal; and
   (d) combining the first and second sets of packet interarrival times to provide a synthetic traffic stream, wherein a packet interarrival time is a time interval between the arrivals of temporally adjacent, individual packets.

2. The method of claim 1, wherein the number of first packets in the first proportion represents a first percentage of the total number of packets, wherein the number of second packets in the second proportion represents a second percentage of the total number of packets, and wherein the determining step (a) includes:
   (a1) quantifying the total number of packets using at least one of the following techniques: busy hour, busy day, busy month, peak call rate, and committed burst size;
   (a2) multiplying (a) the first percentage and (b) the total number of packets to provide a first number of first packets of the first packet type; and
   (a3) multiplying (a) the second percentage and (b) the total number of packets to provide a second number of second packets of the second packet type, wherein, in the combining steps, a respective one of the first and second numbers of packets is used to generate the corresponding one of the first and second sets of packet interarrival times.

3. The method of claim 1, wherein the at least one of (i) a packet interarrival time of less than a selected value, (ii) a packet payload of voice and/or video information, and (iii) at least a first admission priority is (i) a packet interarrival time of less than a selected value and the at least one of (i) a packet interarrival time of more than the selected value, (ii) a packet payload of information other than voice and/or video information, and (iii) less than the first admission priority is (i) a packet interarrival time of more than the selected value.

4. The method of claim 1, wherein the at least one of (i) a packet interarrival time of less than a selected value, (ii) a packet payload of voice and/or video information, and (iii) at least a first admission priority is (ii) a packet payload of voice and/or video information and the at least one of (i) a packet interarrival time of more than the selected value, (ii) a packet payload of information other than voice and/or video information, and (iii) less than the first admission priority is (ii) a packet payload of information other than the voice and/or video information.

5. The method of claim 1, wherein the at least one of (i) a packet interarrival time of less than a selected value, (ii) a packet payload of voice and/or video information, and (iii) at least a first admission priority is (iii) at least a first admission priority and the at least one of (i) a packet interarrival time of more than the selected value, (ii) a packet payload of information other than voice and/or video information, and (iii) less than the first admission priority is (iii) less than the second admission priority.

6. The method of claim 1, wherein the first set of interarrival times is based on the first proportion and the second set of interarrival times is based on the second proportion.

7. The method of claim 1, wherein the voice and/or video information is voice information, wherein a plurality of third packets are of a third packet type, and wherein a third proportion of the total number of packets is of the third packet type and further comprising:
  (e) based on a third mean and variance, generating a third set of packet interarrival times representative of third packets transmitted and/or to be transmitted over the network, wherein each third packet has a payload of video information, and wherein the distribution of the first set of packet interarrival times is at least substantially lognormal.

8. The method of claim 1, wherein a total number of packet interarrival times in the first set of packet interarrival times is equal to a number of first packets and wherein a total number of packet interarrival times in the second set of packet interarrival times is equal to a number of second packets.

9. The method of claim 1, wherein the first set of packet interarrival times comprises, for each packet interarrival time, a corresponding number of first packets of the first packet type.

10. The method of claim 9, wherein the second set of packet interarrival times comprises, for each packet interarrival time, a corresponding number of second packets of the second packet type.

11. The method of claim 1, further comprising:
  (e) based on the synthetic traffic stream, determining at least one of a required number of buffers and/or buffer capacity, a desired transmission speed of packets, a peak delay of traffic stream, and optimum traffic mix of voice, video, and data other than voice and video of the ATM network.

12. In a packet-switched network, the network comprising at least one Asynchronous Transfer Mode or ATM switch and at least one ATM device other than the ATM switch, a system for characterizing packet interarrival times, comprising:
  (a) means for determining first and second proportions of a total number of packets transmitted and/or to be transmitted by the ATM network over a selected time interval, wherein the first proportion is associated with first packets of a first packet type and the second proportion is associated with second packets of a second packet type;
  (b) means for generating based on a first mean and variance, generating a first set of packet interarrival times representative of first packets, wherein each first packet has at least one of (i) a packet interarrival time less than a selected value, (ii) a packet payload of voice and/or video information, and (iii) at least a first admission priority, and wherein the distribution of the first set of packet interarrival times is at least substantially lognormal;
  (c) means for generating based on a second mean and variance, generating a second set of packet interarrival times representative of second packets, wherein each second packet has at least one of (i) a packet interarrival time of more than the selected value, (ii) a packet payload of information other than voice and/or video information, and (iii) less than the first admission priority and wherein the distribution of the second set of packet interarrival times is at least substantially normal; and
  (d) means for combining the first and second sets of packet interarrival times to provide a synthetic traffic stream, wherein a packet interarrival time is a time interval between the arrivals of temporally adjacent, individual packets.

13. The system of claim 12, wherein the number of first packets in the first proportion represents a first percentage of the total number of packets, wherein the number of second packets in the second proportion represents a second percentage of the total number of packets, and wherein the analyzing means further quantifies the total number of packets using at least one of the following techniques: busy hour, busy day, busy month, peak call rate, and committed burst size; multiplies (a) the first percentage and (b) the total number of packets to provide a first number of first packets of the first packet type; and multiplies (a) the second percentage and (b) the total number of packets to provide a second number of second packets of the second packet type, wherein, in the combining steps, a respective one of the first and second numbers of packets is used to generate the corresponding one of the first and second sets of packet interarrival times.

14. The system of claim 12, wherein the at least one of (i) a packet interarrival time of less than a selected value, (ii) a packet payload of voice and/or video information, and (iii) at least a first admission priority is (i) a packet interarrival time of less than a selected value and the at least one of (i) a packet interarrival time of more than the selected value, (ii) a packet payload of information other than voice and/or video information, and (iii) less than the first admission priority is (i) a packet interarrival time of more than the selected value.

15. The system of claim 12, wherein the at least one of (i) a packet interarrival time of less than a selected value, (ii) a packet payload of voice and/or video information, and (iii) at least a first admission priority is (ii) a packet payload of voice and/or video information and the at least one of (i) a packet interarrival time of more than the selected value, (ii) a packet payload of information other than voice and/or video information, and (iii) less than the first admission priority is (ii) a packet payload of information other than the voice and/or video information.

16. The system of claim 12, wherein the at least one of (i) a packet interarrival time of less than a selected value, (ii) a packet payload of voice and/or video information, and (iii)

at least a first admission priority is (iii) at least a first admission priority and the at least one of (i) a packet interarrival time of more than the selected value, (ii) a packet payload of information other than voice and/or video information, and (iii) less than the first admission priority is (iii) less than the second admission priority.

17. The system of claim 12, wherein the first set of interarrival times is based on the first proportion and the second set of interarrival times is based on the second proportion.

18. The system of claim 12, wherein the voice and/or video information is voice information, wherein a plurality of third packets are of a third packet type, wherein a third proportion of the total number of packets is of the third packet type and wherein the analyzing means, based on a third mean and variance, generates a third set of packet interarrival times representative of third packets transmitted and/or to be transmitted over the network, wherein each third packet has payload of video information, and wherein the distribution of the first set of packet interarrival times is at least substantially lognormal.

19. The system of claim 12, wherein a total number of packet interarrival times in the first set of packet interarrival times is equal to a number of first packets and wherein a total number of packet interarrival times in the second set of packet interarrival times is equal to a number of second packets.

20. The system of claim 12, wherein the first set of packet interarrival times comprises, for each packet interarrival time, a corresponding number of first packets of the first packet type.

21. The system of claim 20, wherein the second set of packet interarrival times comprises, for each packet interarrival time, a corresponding number of second packets of the second packet type.

22. The system of claim 12, wherein:
based on the synthetic traffic stream, at least one of a required number of buffers and/or buffer capacity, a desired transmission speed of packets, a peak delay of traffic stream, and optimum traffic mix of voice, video, and data other than voice and video of the ATM network is determined.

23. In a packet-switched network, the network comprising at least one Asynchronous Transfer Mode or ATM switch and at least one ATM device other than the ATM switch, a system for characterizing packet interarrival times, comprising:
a lognormal number generator operable, based on a first mean and variance, to generate a first set of packet interarrival times representative of first packets of a first packet type transmitted and/or to be transmitted over the network, wherein each first packet has at least one of (i) a packet interarrival time less than a selected value, (ii) a packet payload of voice and/or video information, and (iii) at least a first admission priority, and wherein the distribution of the first set of packet interarrival times is at least substantially lognormal;
a normal number generator operable, based on a second mean and variance, to generate a second set of packet interarrival times representative of second packets of a second packet type transmitted and/or to be transmitted over the network, wherein each second packet has at least one of (i) a packet interarrival time of more than the selected value, (ii) a packet payload of information other than voice and/or video information, and (iii) less than the first admission priority and wherein the distribution of the second set of packet interarrival times is at least substantially normal; and
a combiner operable to combine the first and second sets of packet interarrival times to provide a synthetic traffic stream, wherein a packet interarrival time is a time interval between the arrivals of temporally adjacent, individual packets.

24. The system of claim 23, wherein first and second proportions of a total number of packets have been transmitted and/or are to be transmitted by the ATM network over a selected time interval, wherein the first proportion is associated with the first packet type and the second proportion is associated with the second packet type.

25. The system of claim 23, wherein the number of first packets in the first proportion represents a first percentage of the total number of packets, wherein the number of second packets in the second proportion represents a second percentage of the total number of packets, and wherein the analyzing means further quantifies the total number of packets using at least one of the following techniques: busy hour, busy day, busy month, peak call rate, and committed burst size; multiplies (a) the first percentage and (b) the total number of packets to provide a first number of first packets of the first packet type; and multiplies (a) the second percentage and (b) the total number of packets to provide a second number of second packets of the second packet type, wherein, in the combining steps, a respective one of the first and second numbers of packets is used to generate the corresponding one of the first and second sets of packet interarrival times.

26. The system of claim 23, wherein the at least one of (i) a packet interarrival time of less than a selected value, (ii) a packet payload of voice and/or video information, and (iii) at least a first admission priority is (i) a packet interarrival time of less than a selected value and the at least one of (i) a packet interarrival time of more than the selected value, (ii) a packet payload of information other than voice and/or video information, and (iii) less than the first admission priority is (i) a packet interarrival time of more than the selected value.

27. The system of claim 23, wherein the at least one of (i) a packet interarrival time of less than a selected value, (ii) a packet payload of voice and/or video information, and (iii) at least a first admission priority is (ii) a packet payload of voice and/or video information and the at least one of (i) a packet interarrival time of more than the selected value, (ii) a packet payload of information other than voice and/or video information, and (iii) less than the first admission priority is (ii) a packet payload of information other than the voice and/or video information.

28. The system of claim 23, wherein the at least one of (i) a packet interarrival time of less than a selected value, (ii) a packet payload of voice and/or video information, and (iii) at least a first admission priority is (iii) at least a first admission priority and the at least one of (i) a packet interarrival time of more than the selected value, (ii) a packet payload of information other than voice and/or video information, and (iii) less than the first admission priority is (iii) less than the second admission priority.

29. The system of claim 23, wherein the first set of interarrival times is based on the first proportion and the second set of interarrival times is based on the second proportion.

30. The system of claim 23, wherein the voice and/or video information is voice information, wherein a plurality of third packets are of a third packet type, wherein a third proportion of the total number of packets is of the third packet type and wherein the analyzing means, based on a third mean and variance, generates a third set of packet interarrival times representative of third packets transmitted and/or to be transmitted over the network, wherein each third packet has a payload of video information, and wherein the distribution of the first set of packet interarrival times is at least substantially lognormal.

31. The system of claim 23, wherein a total number of packet interarrival times in the first set of packet interarrival times is equal to a number of first packets and wherein a total number of packet interarrival times in the second set of packet interarrival times is equal to a number of second packets.

32. The system of claim 23, wherein the first set of packet interarrival times comprises, for each packet interarrival time, a corresponding number of first packets of the first packet type.

33. The system of claim 32, wherein the second set of packet interarrival times comprises, for each packet interarrival time, a corresponding number of second packets of the second packet type.

34. The system of claim 23, wherein based on the synthetic traffic stream, at least one of a required number of buffers and/or buffer capacity, a desired transmission speed of packets, a peak delay of traffic stream, and optimum traffic mix of voice, video, and data other than voice and video of the ATM network is determined.

35. The method of claim 1, wherein the packet interarrival times in the synthetic traffic stream are distributed according to the following equation:

$$F(x) = \Psi \cdot \Lambda(\mu_1, \delta^2_1,) + (1-\Psi) \cdot N(\mu_2, \delta^2_2)$$

where a mixing parameter, $\Psi$, is the first proportion,
$\mu_1$ is the first mean,
$\delta_1^2$ is the first variance,
$\mu_2$ is the second mean, and
$\delta_2^2$ the second variance.

36. The system of claim 12, wherein the packet interarrival times in the synthetic traffic stream are distributed according to the following equation:

$$F(x) = \Psi \cdot \Lambda(\mu_1, \delta^2_1,) + (1-\Psi) \cdot N(\mu_2, \delta^2_2)$$

where the mixing parameter, $\Psi$, is the first proportion,
$\mu_1$ is the first mean,
$\delta_1^2$ is the first variance,
$\mu_2$ is the second mean, and
$\delta_2^2$ the second variance.

37. The system of claim 24, wherein the packet interarrival times in the synthetic traffic stream are distributed according to the following equation:

$$F(x) = \Psi \cdot \Lambda(\mu_1, \delta^2_1,) + (1-\Psi) \cdot N(\mu_2, \delta^2_2)$$

where a mixing parameter, $\Psi$, is the first proportion,
$\mu_1$ is the first mean,
$\delta_1^2$ is the first variance,
$\mu_2$ is the second mean, and
$\delta_2^2$ the second variance.

* * * * *